United States Patent Office 3,277,366
Patented Oct. 4, 1966

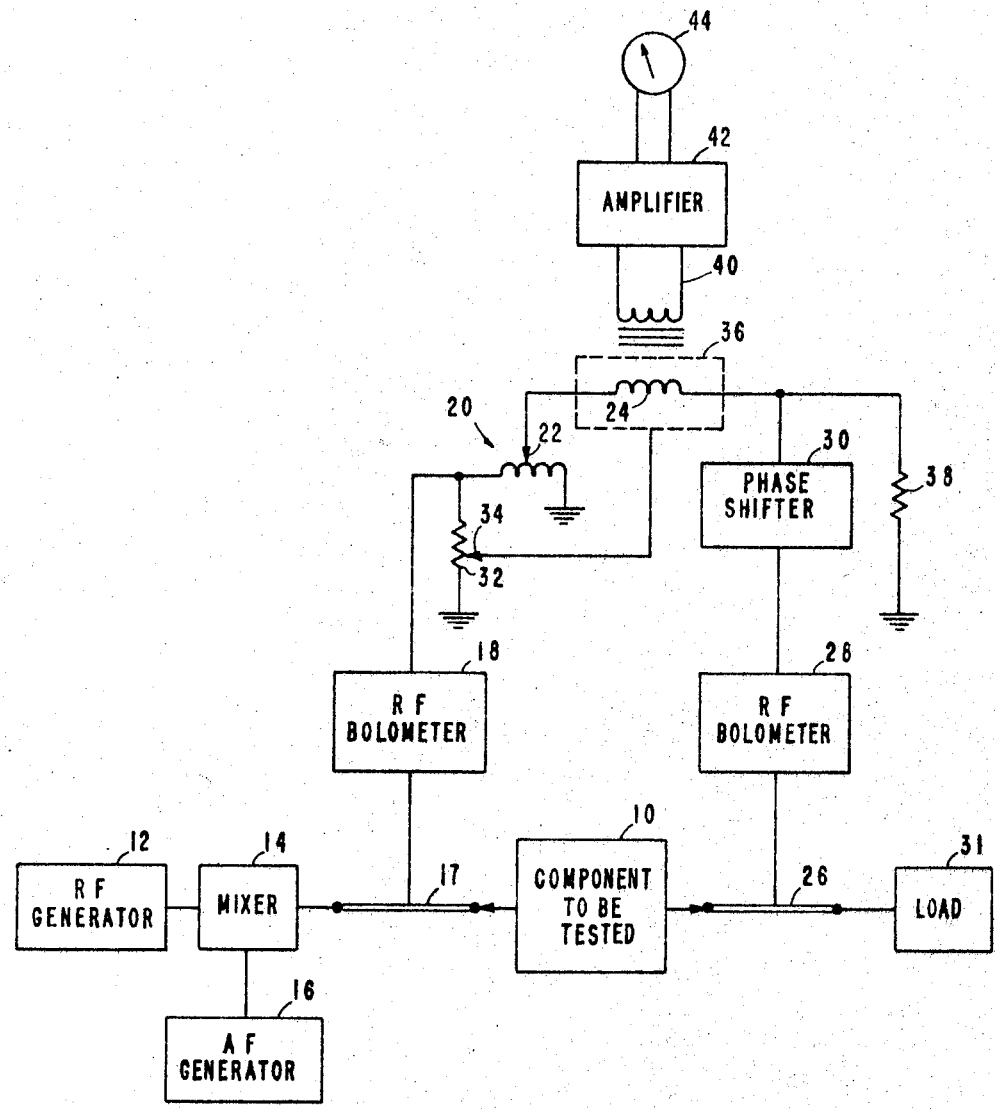

3,277,366
INSERTION LOSS MEASURING APPARATUS HAVING TRANSFORMER MEANS CONNECTED ACROSS A PAIR OF BOLOMETERS
James E. Webb, Administrator of the National Aeronautics and Space Administration, with respect to an invention of Clifford J. Finnie and Danver Schuster
Filed May 6, 1964, Ser. No. 366,226
4 Claims. (Cl. 324—57)

This invention relates generally to testing apparatus and more particularly to apparatus for measuring the insertion loss of a component or network.

In a communication transmission system, the magnitude of the loss caused by the insertion into the system of a new component or network must often be known. This loss is determined by several factors, such as the degree of impedance match at the input terminals, the internal transmission loss in the component to be inserted, and the degree of impedance match at the output terminals. The "insertion loss" at a given frequency is actually the ratio of the powers at that frequency delivered to that part of a system beyond the point of component insertion before and after the insertion.

A common way of measuring the insertion loss of a component is to send a radio frequency signal modulated by an audio frequency signal through the component, placing radio frequency bolometers both before and after the component to be tested, amplifying the audio frequency output of each of the bolometers and comparing the two amplified signals in a null detector. A potentiometer placed in series with one of the audio amplifiers can be varied until a null is achieved and by noting the attenuation required to achieve a null with and without the component in the circuit, the power loss due to the insertion of that component can be determined.

The principal difficulty encountered with prior art apparatus of the foregoing type is that audio amplifiers nearly always have a certain amount of drift or gain variation at different points in time. Thus, if the insertion loss of the component is very small so that the audio frequency signals derived from the bolometers are almost equal, then the difference in the bolometer output signals is also quite small and any drift in either one of the audio amplifiers can effectively mask the difference between the bolometer output signals. Even when very expensive and highly accurate amplifiers having small drifts are utilized, the drift is nevertheless a limiting factor in the accuracy of the test apparatus.

In view of the foregoing, it is an object of the present invention to provide an improved insertion loss measuring apparatus which is more accurate than known prior art apparatus.

It is a more particular object of the present invention to provide an improved insertion loss measuring apparatus whose accuracy is not limited by audio amplifier characteristics. Moreover, it is an object of the present invention to provide an insertion loss measuring apparatus which is extremely accurate, reliable, small in size and weight and can be inexpensively asembled from commercially available low cost parts.

Briefly, in accordance with the invention, a high impedance alternating current sensing device is connected between the output of a pair of bolometers respectively responsive to the signal power inserted into and derived from the component under test. The sensing device can comprise a transformer primary winding coupled to a secondary winding which in turn can be connected through an amplifier to a sensitivity meter. Prior to connecting the bolometers to the input and output terminals of the component, the inputs to the bolometers are connected together and an accurate voltage divider connected between one bolometer output and the current sensing device is adjusted to establish a null current condition in the sensing device. The bolometer inputs are then respectively connected to the input and output terminals of the component and the tap on the voltage divider is adjusted to again establish a current null in the sensing device. The change in position of the voltage divider tap indicates the insertion loss of the component.

The novel features that are considered characteristic of this invention are set forth with particularity in the appended claims. The invention itself, both as to its organization and method of operation, as well as additional objects and advantages thereof, will best be understood from the following description when read in connection with the accompanying drawing which comprises a schematic diagram of a preferred embodiment of the invention.

Attention is now called to the figue which illustrates a component 10 whose insertion loss is to be measured. In order to measure the insertion loss, or in other words the power loss at a particular frequency, a generator 12 capable of providing a signal at that frequency is provided. The output of the generator 12 is connected to the input of a mixer 14. The output of an audio frequency generator 16 is also connected to the input of the mixer 14 for the purpose of modulating the radio frequency signal provided by the generator 12. The output of the mixer 14 is connected to a directional coupler 17 which is connected to the input of a conventional radio frequency bolometer 18.

The output of the bolometer 18 is connected to a first terminal of a voltage divider 20, preferably comprising a ratio transformer, whose second terminal is connected to a reference potential, e.g. ground. The ratio transformer 20 is provided with a movable tap 22 connected to one terminal of a current sensing device comprising a high impedance transformer primary winding 24.

A second directional coupler 26 is connected to the input of a radio frequency bolometer 28 and to a resistive load termination device 31. The output of the bolometer 28 is connected through a phase shifting device 30 whose output in turn is coupled to the second terminal of the transformer primary winding 24. The phase shifting device 31 can comprise a variable capacitor. The first terminal of the ratio transformer 20 is connected through a variable resistor 32 to ground. The resistor 32 is provided with a movable tap 34 which is connected to an electrostatic shield 36 surrounding the transformer primary winding 24. A resistor 38 connects the second terminal of the transformer primary winding 24 to ground.

The transformer primary winding 24 is coupled to a secondary winding 40 whose terminals are connected to the input of an amplifier 42. The output of the amplifier 42 is connected to the input of a sensitivity meter 44.

In the use of the apparatus illustrated, the generator 12 should provide a high frequency output signal, for example in the microwave range. The generator 16 should provide an audio frequency signal, e.g. one kilocycle which modulates the microwave frequency signal in the mixer 14. The bolometer 18 yields at its output terminal a one kilocycle signal whose amplitude is proportional to the signal strength or power of the microwave signal applied to the input thereof. Conventional bolometers are well known in the art and operate essentially by converting the signal power into heat which in turn controls the resistance of an internal element and thus the voltage available at its output terminal.

Prior to actually measuring the insertion loss of component 10, the apparatus is balanced by initially connecting the directional couplers 17 and 26 together without the component 10 being in the circuit. The tap 22 of the ratio transformer 20 is then adjusted to establish a null current condition in the transformer coil 24, as indicated on the meter 44 and the position of the tap 22 is noted.

Subsequently, the directional couplers 17 and 26 are respectively connected to the input and output terminals of the component 10. The tap 8 is then readjusted to again obtain a current null in the winding 24. The change in position of the ratio transformer tap 22 indicates the insertion loss of the component 10. The ratio transformer of course can be calibrated with components having known insertion losses at certain frequencies to thereby enable the insertion loss of other components to be determined.

Inasmuch as a small phase shift may be introduced by the component 10, the phase shifting network 30 is connected between the output of the bolometer 28 and the transformer winding 24 to thereby permit the effect of the introduced phase shift to be compensated for. In use, once a null condition is nearly established, by adjustment of the ratio transformer tap 22, the phase shift network 30 is adjusted to more precisely develop a null condition.

In order to prevent stray currents from being induced in the transformer primary winding 24, the electrostatic shield 36 is provided. The shield can be maintained at approximately the same potential as the winding 24 by proper adjustment of the tap 34 of the variable resistor 32. The resistor 38 connected between ground and one side of the transformer winding 34 balances the impedance on the opposite sides of the winding 34.

From the foregoing, it should be appreciated that an apparatus for determining the insertion loss of a component has been disclosed herein in which no amplification of the signals detected at the input and output terminals of the components under test is introduced. Instead, a sensitive sensing device including a transformer primary winding is connected between two bolometer outputs so that any differential voltage develops a current in the winding. Thus, the system accuracy is not at all dependent upon amplifier characteristics which are often somewhat unstable. Instability of the amplifier 42 used in the present apparatus does not affect the accuracy of the invention inasmuch as it is introduced only after the signal representing the difference between the bolometer outputs is developed. Thus, it should be appreciated that the accuracy of apparatus constructed in accordance with the invention is dependent only upon the accuracy of the ratio transformer 20, assuming the characteristics of the two bolometers to be identical. Inasmuch as highly accurate ratio transformers are readily available commercially and since differences in bolometer characteristics are negligible, an apparatus constructed in accordance with the present invention can be considerably more accurate than heretofore known apparatus.

What is claimed is:

1. Apparatus for determining the insertion loss of a component at a particular frequency, said apparatus comprising an oscillator for providing an output signal at said particular frequency; an oscillator for providing an audio frequency output signal; means for modulating said particular frequency signal with said audio frequency signal and for providing a modulated output signal; means for applying said modulated output signal to the input terminal of said component; means connecting the output terminal of said component to a load circuit; a first bolometer connected to said component input terminal and responsive to the signal power delivered thereto for developing a proportional output voltage at a first bolometer output terminal; a second bolometer connected to said component output terminal and responsive to the signal power delivered thereat for developing a proportional output voltage at a second bolometer output terminal; a ratio transformer connected directly between said first bolometer output terminal and a source of reference potential, said ratio transformer having a variable voltage tap; and passive circuit means connecting a current sensing device between said variable voltage tap and said second bolometer output terminal.

2. The combination of claim 1 wherein said current sensing device comprises a high impedance transformer primary winding; a transformer secondary winding coupled to said transformer primary winding; and indicator means connected to said transformer secondary winding and responsive to currents induced therein.

3. The combination of claim 2 wherein said passive circuit means includes a variable phase shifting circuit connected in series with said current sensing device.

4. The apparatus of claim 2 including an electrostatic shield enclosing said transformer primary winding and including means for applying a variable voltage thereto.

References Cited by the Examiner

UNITED STATES PATENTS

| 2,442,606 | 1/1948 | Korman | 324—58 X |
| 2,597,303 | 5/1952 | Dickie | 324—106 X |
| 3,020,529 | 2/1962 | Turner | 324—95 X |
| 3,031,614 | 4/1962 | Calvert | 324—57 |

FOREIGN PATENTS 607,656   10/1960   Canada.

OTHER REFERENCES

Engineering Bulletin No. 4 (Ratio Trans.), Gertsch Products, Inc., May 1956.

WALTER L. CARLSON, *Primary Examiner.*

E. E. KUBASIEWICZ, *Assistant Examiner.*